United States Patent [19]

Mitich

[11] 3,724,824
[45] Apr. 3, 1973

[54] HUMIDIFIER
[75] Inventor: Stephen R. Mitich, Walled Lake, Mich.
[73] Assignee: Masco Corporation, Taylor, Mich.
[22] Filed: Oct. 22, 1970
[21] Appl. No.: 82,966

[52] U.S. Cl.................261/92, 261/DIG. 15, 126/113
[51] Int. Cl. ...............................................B01f 3/04
[58] Field of Search..126/113; 210/456; 261/92, DIG. 15

[56] References Cited

UNITED STATES PATENTS

| | | | |
|---|---|---|---|
| 2,583,195 | 1/1952 | Wilcox | 261/92 |
| 2,246,069 | 6/1941 | Schectitel et al. | 261/92 |
| 2,551,227 | 5/1951 | Yost | 261/92 |
| 3,265,372 | 8/1966 | Bradley | 261/30 |
| 3,405,919 | 10/1968 | Fisher et al. | 261/92 |
| 3,599,942 | 8/1971 | Herr | 261/92 |
| 3,595,269 | 7/1971 | Yeagle | 261/92 |
| 3,481,588 | 12/1969 | Lobb | 261/92 |
| 3,056,499 | 10/1962 | Liddell | 210/456 |

Primary Examiner—Tim R. Miles
Assistant Examiner—Steven H. Markowitz
Attorney—Whittemore, Hulbert & Belknap

[57]   ABSTRACT

A drum type humidifier in which the evaporating medium consists of a rotating sleeve of porous material disposed within a housing having an air inlet and an air outlet. The incoming air is directed by a diverter means at the air inlet into one end of the drum and passes through the evaporating material to the air outlet. An air distributing cone is disposed within the drum and has a large diameter end at the inner end of the drum and tapers to a smaller end disposed at the inlet end of the drum. The cone is shaped to control the air flow to cause a relatively uniform flow through all portions of the evaporating material, thereby greatly increasing the efficiency of the humidifier.

2 Claims, 3 Drawing Figures

INVENTOR.
Stephen R. Mitich

INVENTOR.
Stephen R. Mitich.
BY Whittemore,
Hulbert & Belknap
ATTORNEYS

HUMIDIFIER

Drum type humidifiers are well known and generally employ a cylindrical sleeve of polyurethane foam or other material as the evaporating medium. The sleeve is partially immersed in a water reservoir maintained at a substantially constant level and is constantly rotated at a slow speed as the air flows through the sleeve to add moisture to the air. A humidifier of this type may be mounted on a hot or cold air duct forming part of a hot air furnace system or on the furnace itself. A fan or blower may be provided for circulating the air to be humidified through the evaporating medium, or the pressure differential in the furnace system may be utilized to effect the flow of air through the humidifier. In prior drum type humidifiers the flow of air through the evaporating sleeve has been effected principally, if not entirely, by the pressure differential in the system.

The present invention is directed to a humidifier of the type described in which a means is provided to control the flow of air into and within the interior of the drum and through the porous sleeve in such a way as to cause a relatively uniform flow of air through all portions of the sleeve, thus resulting in the addition of a greater amount of moisture to the air than is possible with conventional drum type humidifiers of the same size operating at the same rate of air flow. The air flow controlling means comprises a diverter at the air inlet in the housing and a flow controlling, cone-like member within the drum which is contoured to exert a predetermined effect on the air flow into and through the porous sleeve. It has been found that the efficiency of a humidifier equipped with the air controlling means of this invention is improved by as much as 40 per cent for a given size evaporating medium and volume of air flow. The reason for the improved efficiency appears to be that in conventional drum type humidifiers which rely solely upon a pressure differential to cause air to flow through the sleeve, the air in some portions of the interior of the drum tends to remain relatively stagnant or static and a considerable quantity of air is even by-passed out of the inlet end of the drum without ever passing through the evaporating sleeve. The existence of the static air condition within some portions of the drum means that relatively little air is allowed to pass through certain portions of the evaporating sleeve, with the result that those portions of the sleeve through which the air does pass in large volume tend to dry out while the relatively unused portions of the sleeve remain relatively wet. The air cannot evaporate the maximum amount of moisture from the sleeve under these conditions. By positively controlling the air flow patterns within the drum by the use of the air controlling means of this invention the static conditions within the drum are eliminated, by-passing of any substantial quantity of air around the sleeve is prevented, and all portions of the sleeve are utilized to add moisture to the air.

IN THE DRAWINGS

Figure 1:
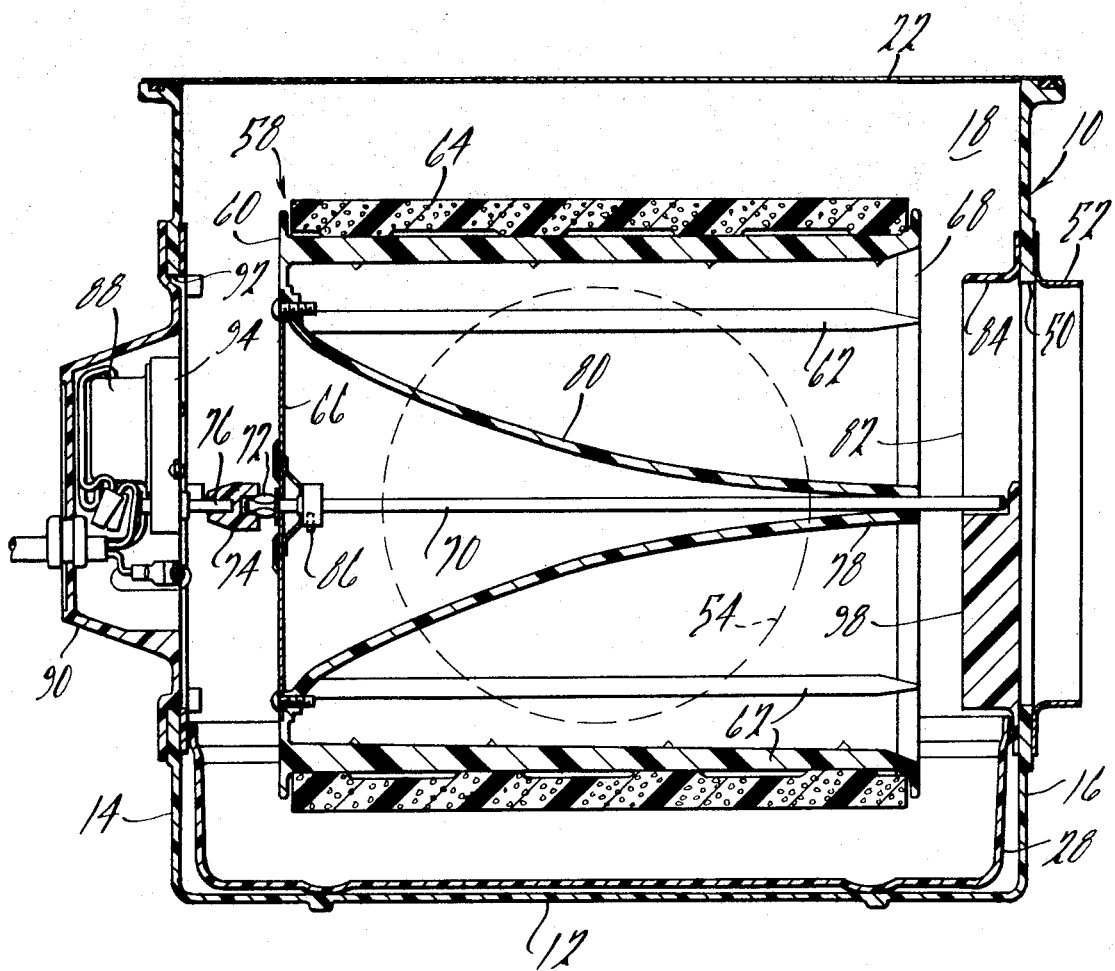
FIG. 1 is a vertical sectional view of a drum type humidifier according to the present invention.
Figure 2:
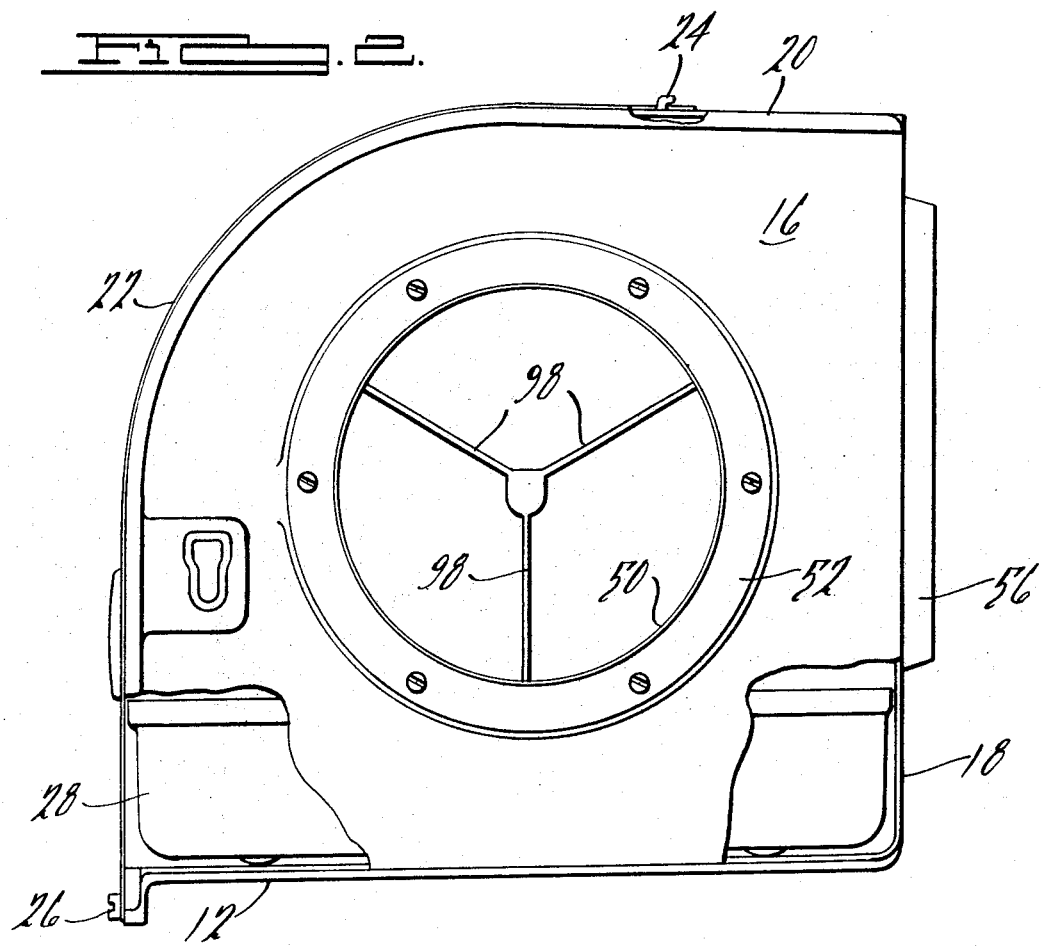
FIG. 2 is an end elevational view with parts broken away.

The humidifier housing 10 comprises a bottom wall 12, end walls 14 and 16, a side wall 18, a top wall 20, and a closure plate 22, the upper end of which is secured as at 24 to the top wall 20 and the lower end of which is secured to the bottom wall 12 of the housing by one or more screws 26. The closure plate 22 may be removed by removing screws 26 to permit access to the interior of the housing 10.

Figure 3:
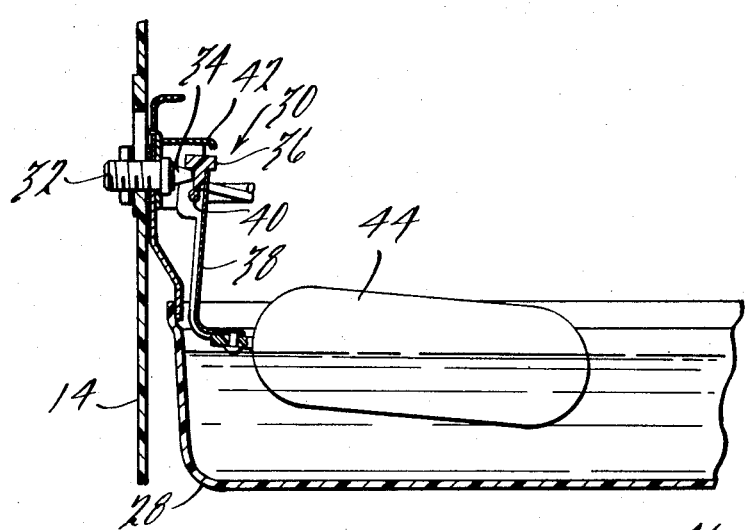
FIG. 3 is a fragmentary sectional view of a portion of the water reservoir.

A water pan 28 is adapted to be supported on the bottom wall 12 of the housing and contains a supply of water maintained at a relatively constant level by a float control valve 32 of the kind illustrated in FIG. 3. A fitting 32 entering through the end wall 14 of the housing is adapted to be connected to a water conduit and includes a nozzle 34 on its inner end which is adapted to be closed by a valve member 36 carried on the upper end of a lever 38 which is pivoted at 40 to a supporting bracket 42 mounted on the wall 14. A float 44 is secured on the lower end of the lever 38, and when the volume of water in the reservoir 28 drops below a certain level, the pivoting of lever 38 will cause the valve member 36 to move away from nozzle 34 to discharge water from the nozzle into the reservoir until the desired water level is obtained, whereupon the valve member 36 will close the nozzle 34.

The end wall 16 of the housing is provided with an inlet opening 50 surrounded by a mounting sleeve 52 by means of which the inlet 50 may be connected to a hot or cold air duct or other part of a furnace system. The side wall 18 of the housing is provided with an outlet opening 54 which has a flange 56 through which humidified air is discharged back into the furnace system.

A drum indicated generally at 58 is disposed within the housing 10 for rotation on a horizontal axis and includes a cylindrical framework 60 consisting of horizontally disposed, angularly spaced members 62 on which a sleeve 64 is mounted. The sleeve 64 may have a convoluted inner surface and is made of polyurethane foam which is porous and is adapted to readily pass air therethrough when wetted by the water in reservoir 28. An end wall 66 closes the inner end of the drum while the outer end 68 of the drum is open and disposed in alignment with the air inlet 50 in the housing 10.

The drum 58 is mounted for rotation in a horizontal axis by a shaft 70 which extends through the end wall 66 and has a coupling member 72 thereon for drivingly connecting the shaft 70 to a coupling element 74 secured on the end of a motor driven shaft 76. The shaft 70 extends through the outer end 78 of the flow controlling member 80 which may be formed integrally with the framework 60 which supports sleeve 64. The outer end of the shaft 70 is rotatably supported by a diverter member 82 which is secured on the inner side of the housing wall 16 around the air inlet 50. The diverter 82 includes an inwardly directed annular flange 84 closely spaced from the outer end of the drum 58 to direct air passing through air inlet 50 into the interior of the drum 58. A setscrew 86 secures the drum 58 to the shaft 70 for rotation therewith.

An electric motor 88 is mounted within a cup-shaped casing 90 mounted over an opening 92 in the end wall 14 of the housing 10. The drive shaft 76 is driven by the electric motor 88 through a speed reduction unit 94 to rotate the drum 58 at a relatively low speed, such as 1 revolution per minute.

A portion of the sleeve 64 is immersed in and rotates through the water in the reservoir 28 so that the material from which the sleeve 64 is made will be maintained constantly wet. The air entering inlet 50 into the interior of the drum will evaporate moisture from the sleeve 64 as the air passes outwardly through the sleeve. The humidified air is discharged through the outlet 54 in the housing 10.

The flow controlling member 80 is generally cone-shaped and has its larger diameter end at the inner end of the drum and tapers to a relatively small outer end at the inlet end of the drum. The contour of the member 80 may approximate an exponential curve, although other shapes including a true conical shape may be used. The presence of the member 80 within the drum exerts a positive controlling effect upon the air flow patterns within the drum and through the sleeve 64 to cause the air to flow relatively uniformly through all portions of the sleeve. The air within the drum is constantly being displaced by the incoming layers of air which travel along the surface of the cone 80. Thus the flow of air through the sleeve 64 is not effected solely by the pressure differential between the interior of the drum and the exterior thereof as in prior drum type humidifiers, but is positively controlled by the cone 80 as well as being subjected to a pressure differential.

The diverter member 82 at the air inlet 50 includes a series of vanes 98 which tend to straighten the air as it flows through the inlet. The spacing of the annular flange 84 on the diverter 82 from the open end of the drum 58 may be of the order of one-half inch or slightly more in larger size units, but the diverter 82 and its relation to the drum 58 are of importance in insuring a properly controlled air flow through the drum.

What I claim as my invention is:

1. A humidifier including a housing having an air inlet and an air outlet, a water reservoir and means for maintaining the water at a substantially constant level therein, a porous evaporator means rotatably mounted in said housing and adapted to be wetted by the water in said reservoir, said evaporator means comprising a generally cylindrical drum having a closed inner end and an open outer end opposed to said air inlet whereby air to be humidified enters said open end of said drum and passes through said drum to said air outlet, an air flow controlling means in said drum comprising a generally conical member of increasing slope extending substantially throughout the length of said drum and having its larger diameter end at the inner end of said drum and its smaller diameter at said open end of said drum for causing the air to flow along predetermined paths within said drum which effect substantially uniform flow of air through the entire cylindrical surface of said drum, a horizontally disposed drive shaft on which said drum is coaxially secured for rotation therewith, the inner end of said drive shaft extending through said inner end of said drum, motor means on said housing and coupled to said inner end of said drive shaft for rotating said drum at a predetermined speed, a diverter at said air inlet in said housing, said diverter having an annular flange projecting toward and in close proximity to said open end of said drum to direct the flow of air into said drum, said drive shaft having its outer end extending through said smaller diameter end of said conical member and being journaled on said diverter.

2. A humidifier according to claim 1 wherein said diverter includes a hub portion and a series of radially extending air directing vanes extending from said hub portion, said drive shaft having its outer end journaled in said hub portion.

* * * * *